United States Patent
Ishii

[11] Patent Number: 6,100,755
[45] Date of Patent: Aug. 8, 2000

[54] PHASE DECISION CIRCUIT

[75] Inventor: Satoru Ishii, Mobara, Japan

[73] Assignee: Futaba Denshi Kogyo Kabushiki Kaisha, Mobara, Japan

[21] Appl. No.: 09/104,167

[22] Filed: Jun. 25, 1998

[51] Int. Cl.[7] ................................................ H03D 3/00
[52] U.S. Cl. .......................... 329/304; 375/324; 329/308
[58] Field of Search .................................. 329/304, 308, 329/309, 310; 375/324, 328, 340

[56] References Cited

U.S. PATENT DOCUMENTS

| 4,998,261 | 3/1991 | Van Driest et al. .................. 375/1 |
| 5,440,269 | 8/1995 | Hwang ................................. 329/318 |
| 5,533,060 | 7/1996 | Kameo et al. ...................... 375/332 |

FOREIGN PATENT DOCUMENTS

5-135807   6/1993   Japan ..................................... 329/304

*Primary Examiner*—Robert Pascal
*Assistant Examiner*—Henry Choe
*Attorney, Agent, or Firm*—Oblon, Spivak, McClelland, Maier & Neustadt, P.C.

[57] ABSTRACT

A phase decision circuit that can reduce the memory capacity of a ROM forming a look-up table. The quadrant decision section judges the quadrant to which an input signal belongs. The address conversion section converts the I-component digital signal and the Q-component digital signal of an input signal into address data based on the quadrant data. The phase angle data is read out of the ROM look-up table based on the converted address data so that the memory capacity of a ROM forming the ROM look-up table can be reduced to ⅛ of that of the conventional table, for example, in the QPSK modulation.

3 Claims, 5 Drawing Sheets

| 1ST QUADRANT | θd | 5TH QUADRANT | 180 + θd |
| --- | --- | --- | --- |
| 2ND QUADRANT | 90 − θd | 6TH QUADRANT | 270 − θd |
| 3RD QUADRANT | 90 + θd | 7TH QUADRANT | 270 + θd |
| 4TH QUADRANT | 180 − θd | 8TH QUADRANT | 360 − θd |

θd IS A REFERRED ROM LOOK-UP TABLE DATA

PHASE DECISION CIRCUIT

BACKGROUND OF THE INVENTION

1. Field of the Invention

This invention relates to a device for detecting the phase of an input signal, and more particularly to a device suitable for use in a demodulator for QPSK (Quadrature Phase Shift Keying) modulated signals.

2. Description of the Related Art

The PSK (Phase Shift Keying) modulation system is a modulation system which discretely varies the phase of a carrier according to digital codes. This modulation system is widely used in satellite communication fields because of its low error rate and its narrow occupied bandwidth. In the PSK modulation system, a basic modulation system is a binary PSK modulation (BPSK) system. In the BPSK modulation system, phase data "0" and "π" are respectively allocated to binary data "1" and "0". That is, in the BPSK modulation system, a carrier is transmitted without any phase shift when datum to be transmitted is "1" while a carrier is transmitted with a phase shift of π when datum to be transmitted is "0".

Figure 6:
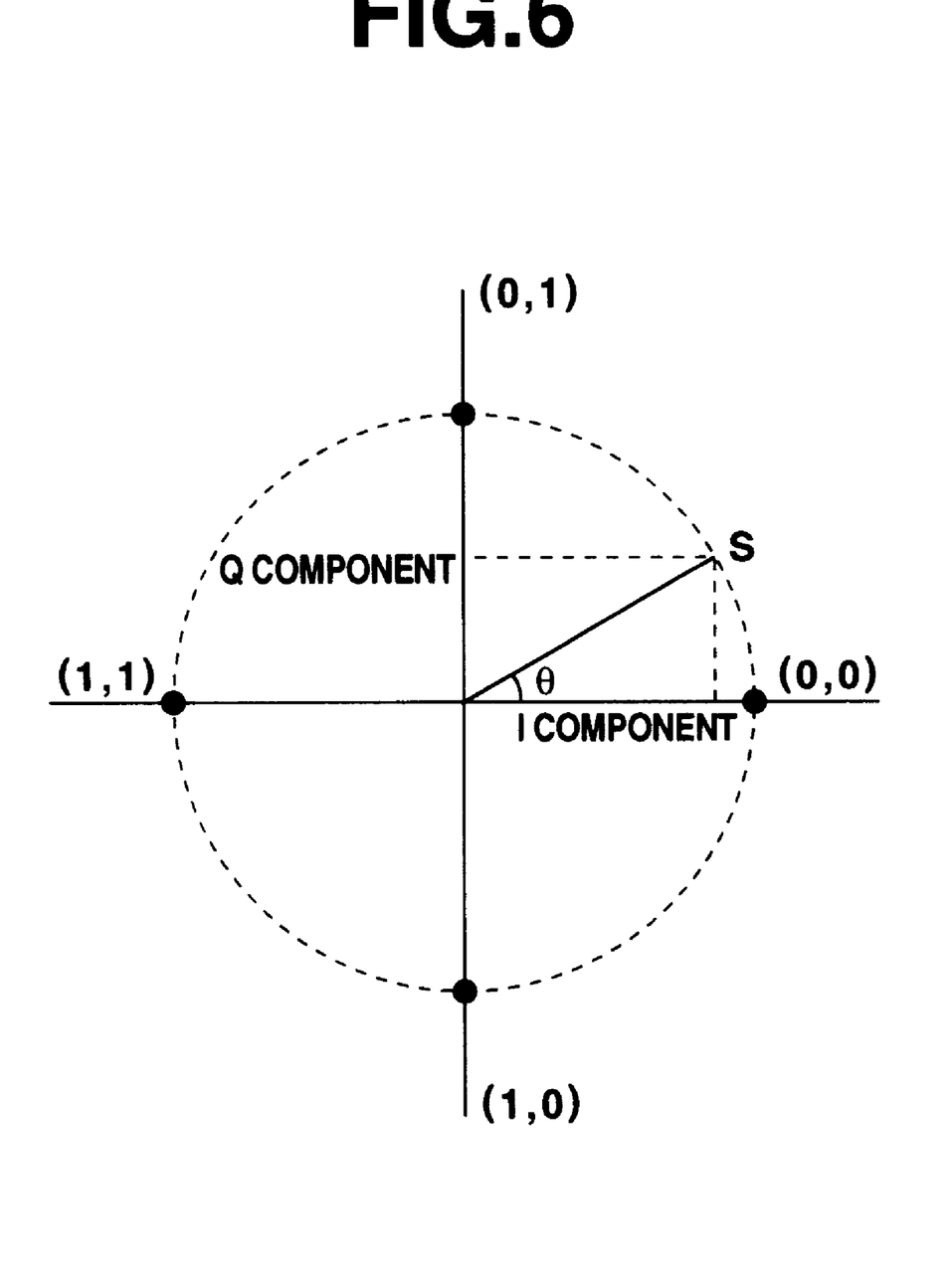
FIG. 6 is a diagram illustrating the distribution of QPSK signal points.

The 4-phase PSK (QPSK) modulation system is widely used as a PSK modulation system. In the QPSK modulation system, four phase shift data "0", "π/2", "π", and "3 π/2" are for example allocated to four combinations of two bits. That is, in the QPSK modulation system, a carrier is transmitted without any phase shift when two bits to be transmitted is (00). A carrier is transmitted without with a phase shift of π/2 when two bits to be transmitted is (01). A carrier is transmitted without with a phase shift of π when two bits to be transmitted is (11). A carrier is transmitted without with a phase shift of 3π/2 when two bits to be transmitted is (10). Signal points corresponding to 2-bit data to be transmitted is shown in FIG. 6.

Figure 7:
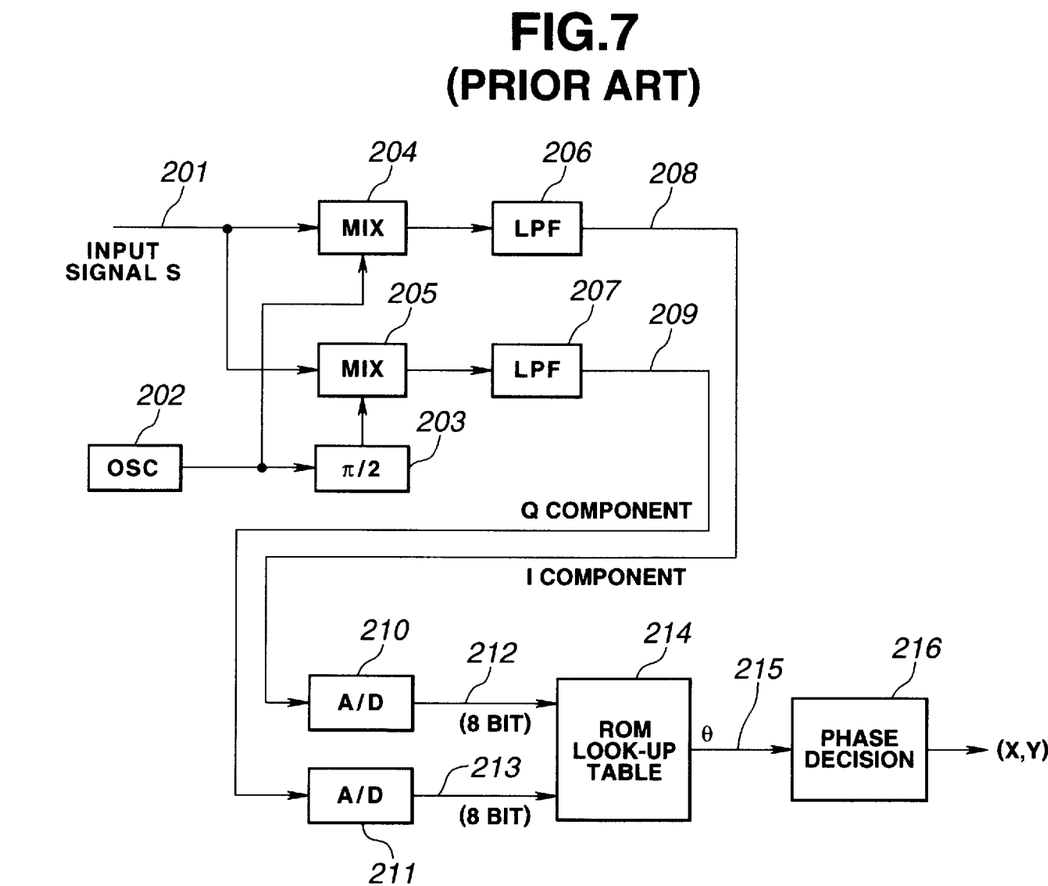
FIG. 7 is a block diagram illustrating the configuration of a conventional QPSK demodulation circuit.

An example of the configuration of a modulator which modulates the QPSK signal is shown in FIG. 7.

Referring to FIG. 7, the mixer (MIX) 204 mixes a QPSK signal received as an input signal with a local oscillation signal supplied from the local oscillator (OSC) 202. The local oscillation signal is a signal in synchronism with the input signal S. The mixer 204 outputs the sum of two input signals and the difference of two input signals. The low-pass filter (LPF) 206 extracts only the difference signal component and inputs it as the I component of the input signal S to the analog to digital (A/D) converter 210.

The π/2 phase shifter 203 shifts a local oscillation signal from the local oscillator (OSC) by π/2. The mixer 205 receives the input signal S and the local oscillation signal shifted by π/2. Hence, the mixer 205 outputs the sum and difference frequency signals of the input signal S and the π/2 phase shifted local oscillation signal. The low-pass filter (LPF) 207 extracts only the difference signal component and outputs it as the Q component of the input signal S to the analog to digital (A/D) converter 211.

The I component 212 from the A/D converter 210 and the Q component 213 from the A/D converter 211 are supplied as address signals to the ROM look-up table 214. The I component 212 is for example a 8-bit digital signal while the Q component 213 is for example a 8-bit digital signal. The ROM look-up table 214 stores phase shift angles. The ROM look-up table 214 receives as an address the I component 212 and the Q component 213 and outputs the phase angle θ of the input signal S. The phase decision section 216 receives the output 215 from the table 214 and then outputs 2-bit data (X, Y) corresponding to the phase angle θ. Thus, the input signal S QPSK modulated is demodulated.

When the input signal S is input as shown in FIG. 6, the phase decision section 216 receives data on the phase angle θ read out of the ROM lookup table 214 and outputs demodulation data (0, 0). The ROM look-up table 214 stores data on phase angles 0 to 2π. Since 2-bit data can be transmitted as one symbol in the QPSK modulation system, high rate transmission can be performed with a narrow transmission frequency band without an increase in the modulation rate.

Where the address used to refer to the ROM look-up table 214 is represented in 8 bits and the phase angle data read out of the ROM look-up table is represented in 8 bits, it is needed that the ROM forming the ROM look-up table 214 has a memory capacity of 4 k words. The ROM forming the ROM look-up table 214 is generally built on the demodulation IC chip.

Hence, there is the problem in that the use of a 64 k-word ROM results in increasing the implementing area as well as the unit price of the demodulation IC chip.

SUMMARY OF THE INVENTION

The present invention is made to overcome the above-mentioned problems. The object of the invention is to provide a phase decision circuit that allows a ROM forming a ROM look-up table to be built in a demodulation IC chip without an increase in chip unit price.

According to a first aspect of the present invention, a phase decision circuit comprises quadrant decision means for detecting a quadrant to which an input signal belongs, based on an I component and a Q component of the input signal, and then outputting quadrant data representing the detected quadrant; a look-up table used to read phase angle data of the input signal with respect to a reference phase using the I component and the Q component of the input signal handled as address data; address conversion means for converting the address data according to the quadrant data; and phase angle data correction means for correcting the phase angle data read out of the look-up table according to the quadrant data; wherein the look-up table stores only phase angle data corresponding to a reference unit quadrant in a quadrant decided by the quadrant decision means; wherein the address conversion means converts address data into address data corresponding to the reference unit quadrant; wherein the phase angle correction means corrects the phase angle data read out of the look-up table to correspond to phase angle data in a quadrant to which the input signal belongs.

In the phase decision circuit according to the present invention, the quadrant data represents whether or not quadrant data belongs to any one among eight quadrants.

Moreover, in the phase decision circuit according to the present invention, the input signal comprises a 4-phase PSK modulation signal; and two-bit data is demodulated from the corrected phase angle data.

According to the present invention, the memory capacity of the look-up table can be reduced to ⅛, compared with the prior art configuration, by setting the number of quadrants to 8. Where the phase decision circuit of the present invention is integrated within the demodulation IC chip, the chip area can be reduced so that the unit price of the chip can be reduced.

The above and other objects, features and advantages of the present invention will become apparent from the fol-

DETAILED DESCRIPTION OF THE PREFERRED EMBODIMENTS

The embodiments according to the present invention will now be described below in detail with reference to the attached drawings.

Figure 1:
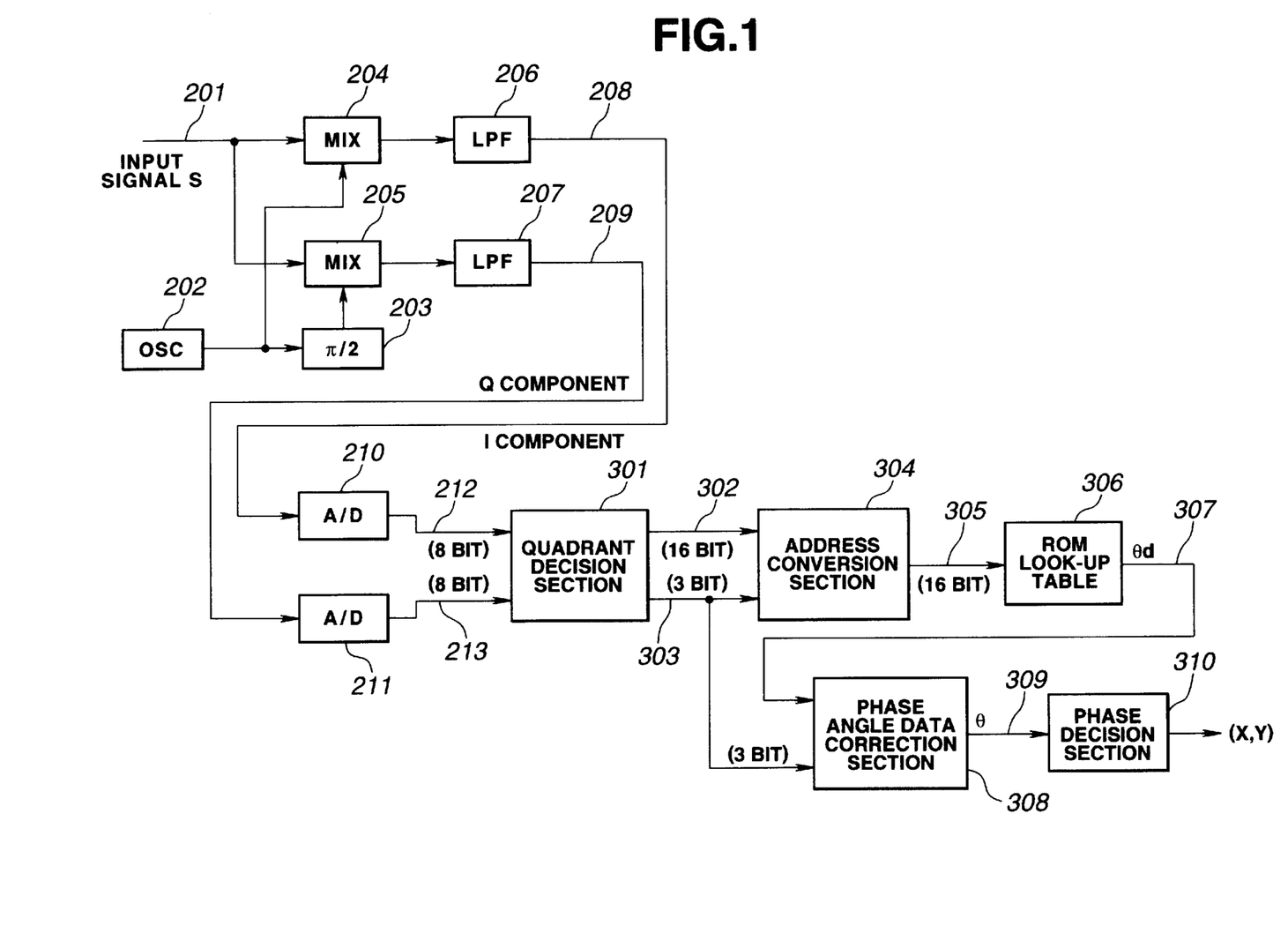
FIG. 1 is a block diagram illustrating a phase decision circuit according to an embodiment of the present invention.

FIG. 1 is a block diagram illustrating a block diagram illustrating the configuration of a phase decision circuit according to the present invention.

Referring to FIG. 1, the mixer (MIX) 204 receives a QPSK signal 201 as an input signal S and then mixes it with a local oscillation signal from the local oscillator (OSC) 202. The local oscillation signal is a signal in synchronism with the carrier of the input signal S. The mixer 204 outputs the sum and difference frequency signals of two signals supplied thereto. The low-pass filter (LPF) 206 extracts only the difference signal component and outputs it as the I component 208 of the input signal S to the analog to digital (A/D) converter 210.

The π/2 phase shifter 203 shifts the local oscillation signal from the local oscillator (OSC) 202. The π/2 phase shifted signal is supplied to the mixer (MIX) 205. The mixer 205 outputs the sum and difference frequency signals of the input signal S and the π/2 shifted local oscillation signal. The low-pass filter (LPF) 207 extracts only the difference signal component and outputs it as the Q component 209 of the input signal S to the analog to digital converter (A/D) 211.

Figure 2:
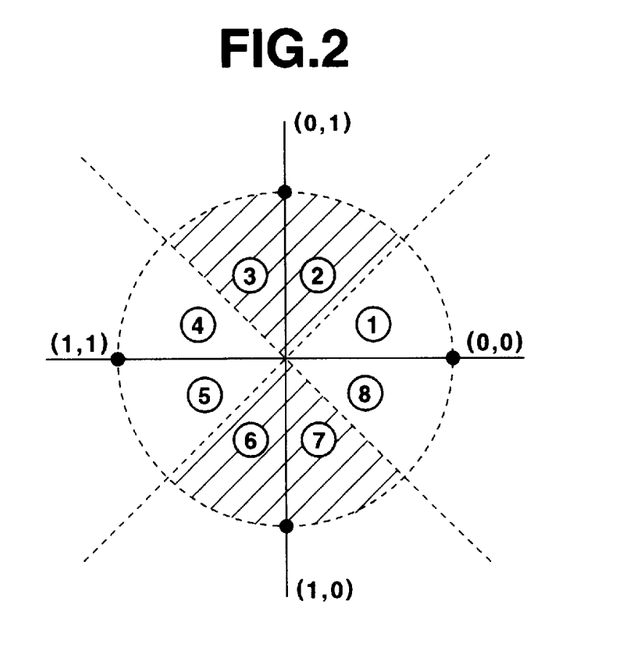
FIG. 2 is a diagram showing relationships between QPSK signal points and quadrants.

The quadrant decision section 301 receives the I component 212 digital-converted by the A/D converter 210 and the Q component 213 digital-converted by the A/D converter 211 and decides the quadrant to which the input signal S belongs, based on the two components 212 and 213. For example, the plane is divided into eight quadrants as shown in FIG. 2. The quadrant decision section 301 outputs quadrant data 303 showing any one of the first quadrant (1) to the eighth quadrant (8). This means that 3 bits suffice for the quadrant data 303 representing the quadrants.

The quadrant decision section 301 also decides the quadrant to which the input signal S belongs, based on the difference between the upper bits of the I component 212 and the upper bits of the Q component 213 and the sign bits of them.

The I component 212 is formed of 8 bits while the Q component 213 is formed of 8 bits. The quadrant decision section 301 synthesizes the 8-bit I component with the 8-bit Q component and outputs the resultant 16-bit data without any change. The ROM look-up table 306 receives the 16-bit data as address data. Then the phase angle data θ d corresponding to the address data is read out of the ROM look-up table 306.

Figure 3:
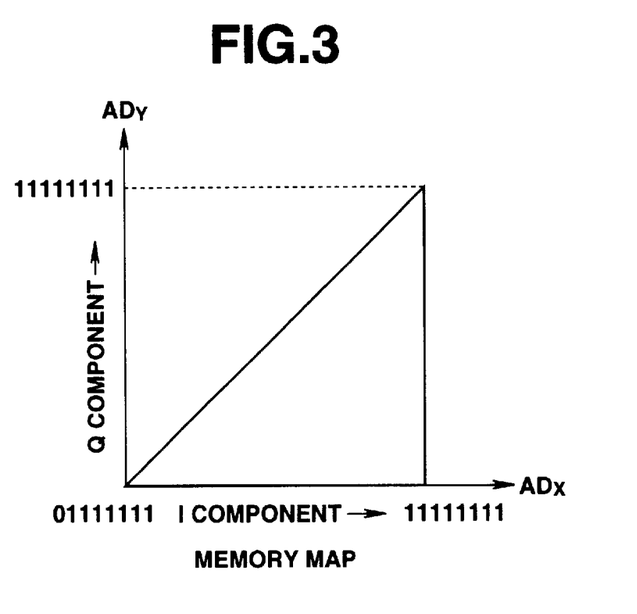
FIG. 3 is a diagram showing a memory map for a ROM look-up table according to the present invention.

In this case, the ROM look-up table 306 stores only the phase angle data in the triangle area (0° to 45°) shown in FIG. 3 corresponding to the first quadrant (1). The storage capacity of a ROM forming the ROM look-up table 306 can be reduced to ⅛ of that of the prior art table. In the memory map shown in FIG. 3, the x-coordinate represents the address data ADx of the I-component while the y-coordinate represents the address data ADy of the Q-component.

Where the output bit number of each of the A/D converters 210 and 211 is 8 bits, the I-component has the address data range of 10000000 to 11111111 while the Q-component has the address data range of 10000000 to 11111111.

Hence, when the quadrant decision section 301 judges that the inputs signal S belongs to the quadrant of either an address range except the above-mentioned address range or the second quadrant (2) in which phase data are not stored in the ROM look-up table 306, the 16-bit address data formed of the I-component 212 and the Q-component 213 must be converted in such a way that it virtually belongs to the address range in the first quadrant (1).

The address conversion section 304 performs the above-mentioned address conversion. The address conversion section 304 receives 3-bit quadrant data 303 from the quadrant decision section 301.

The address conversion section 304 implements an address conversion of 16-bit address data based on the quadrant data 303. However, when the quadrant data 303 belongs to the second quadrant (2) shown with the shaded portion in FIG. 2, the address data 212 of the I component and the address data 213 of the Q-component are interchanged to execute address conversion of 16-bit address data 305. When the quadrant data 303 belongs to the third quadrant (3), the two's complement of the address data 212 on the I-component is operated. The address data 212 of the I-component as the two's complement and the address data 213 of the Q-component are interchanged. Then the 16-bit address data 305 is output through address conversion.

When the input signal S belongs to the fourth quadrant (4), the two's complement of the address data 212 on the I-component is operated. 16-bit address data 305 which is formed of the address data 212 of the I-component as the two's complement and the address data 213 of the Q-component 213 is obtained by address conversion. Moreover, when the input signal S belongs to the fifth quadrant (5), the two's complement of the address data 212 on the I-component is operated while the two's complement of the address data 213 on the Q-component is operated. 16-bit address data 305 which is formed of the address data 212 of the I-component as the two's complement and the address data 213 of the Q-component 213 is obtained by address conversion.

Moreover, when the input signal S belongs to the sixth quadrant (6), the two's complement of the address data 212 of the I-component is operated while the two's complement of the address data 213 of the Q-component is operated. The address data 212 of the I component as the two's complement and the address data 213 of the Q-component as the two's complement are interchanged to obtain 16-bit address data 305 by address conversion. Moreover, when the input signal S belongs to the seventh quadrant (7), the two's complement of the address data 213 of the Q-component is operated. Then the address data 212 of the I component and the address data 213 of the Q-component as the two's complement of the Q component are interchanged to execute address conversion of 16-bit address data 305. Moreover, when the input signal S belongs to the eighth quadrant (8), the two's complement of the address data 213 on the Q-component is operated. 16-bit address data 305 formed of the address data 212 of the I-component and the address data 213 as the two's complement of the Q-component 213 is obtained by address conversion.

The address data 302 of 16 bits is converted into the address data 305 in the address range of the first quadrant (1) in spite of the input signal S which belongs to any one of quadrants. The phase shift angle θ d corresponding to the address data 305 is read out of the ROM address table 306 based on the 16-bit address data 305. The phase shift angle θ d is represented, for example, in the form of 8 bits. However, the phase shift angle ranging 0° to 45° in the first quadrant (1) is represented in an analog form as shown in FIG. 3.

Figure 4:
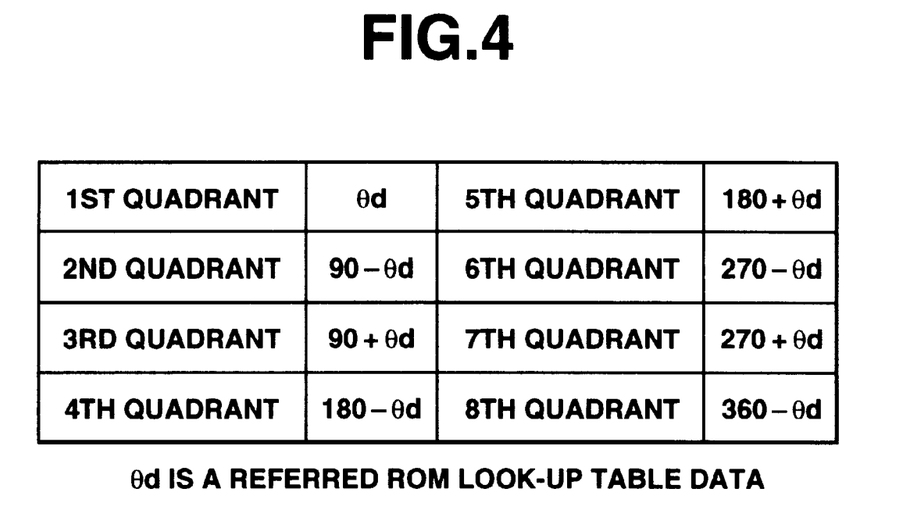
FIG. 4 is a table illustrating contents for correction in the phase data correction section according to the present invention.

The phase shift angle θ d read out of the ROM look-up table 306 is supplied to the phase angle data correction section 308. The phase angle data correction section 308 corrects the quadrant angle data θ d based on 3-bit quadrant data supplied to the quadrant decision section 301. An aspect of the correction is shown in FIG. 4. That is, where the input signal S belongs to the first quadrant (1), the phase shift angle data θ d is output as correction phase data θ without any correction. Where the input signal S belongs to the second quadrant (2), an arithmetic operation of (90−θ d) is performed. The operation result is output as correction phase shift angle data θ. Where the input signal S belongs to the third quadrant (3), an arithmetic operation of (90+θ d) is performed. The operation result is output as correction phase shift data θ.

Moreover, where the input signal S belongs to the fourth quadrant (4), an arithmetic operation of (180−θ d) is performed. The operation result is output as correction phase shift data θ. Where the input signal S belongs to the fifth quadrant (5), an arithmetic operation of (180+θ d) is performed. The operation result is output as correction phase shift angle data θ.

Furthermore, where the input signal S belongs to the sixth quadrant (6), an arithmetic operation of (270−θ d) is performed. The operation result is output as correction phase shift angle data θ. Where the input signal S belongs to the seventh quadrant (7), an arithmetic operation of (270+θ d) is performed. The operation result is output as correction phase shift angle data θ.

Where the input signal S belongs to the eighth quadrant (8), an arithmetic operation of (360−θ d) is performed. The operation result is output as correction phase shift angle data θ.

Thus, even when the ROM look-up table 306 is formed of a ROM having a memory capacity reduced to ⅛ of that of the conventional ROM, the correction phase angle data ranging 0 to 360° can be provided. The phase decision section 310 receives correction phase angle data θ and then outputs two-bit data (X, Y) corresponding to the correction phase angle data θ, so that the input signal S QPSK-modulated can be demodulated. As shown in FIG. 3, the memory capacity of the ROM forming the ROM look-up table 306 can be reduced to ⅛ compared with the prior art memory capacity. However, the number of addresses of the I-component is 8 bits while the number of addresses of the Q-component is 8 bits. This feature allows the memory capacity twice the capacity of the ROM look-up table 306 to be addressable. That is, the address number has redundancy. When the demodulation IC device includes the phase decision circuit, the chip area slightly increases because of the address number with redundancy. In the modification of the phase decision circuit according to the embodiment of the present invention, an increase in chip area can be prevented by removing the redundancy of the address number.

Figure 5:
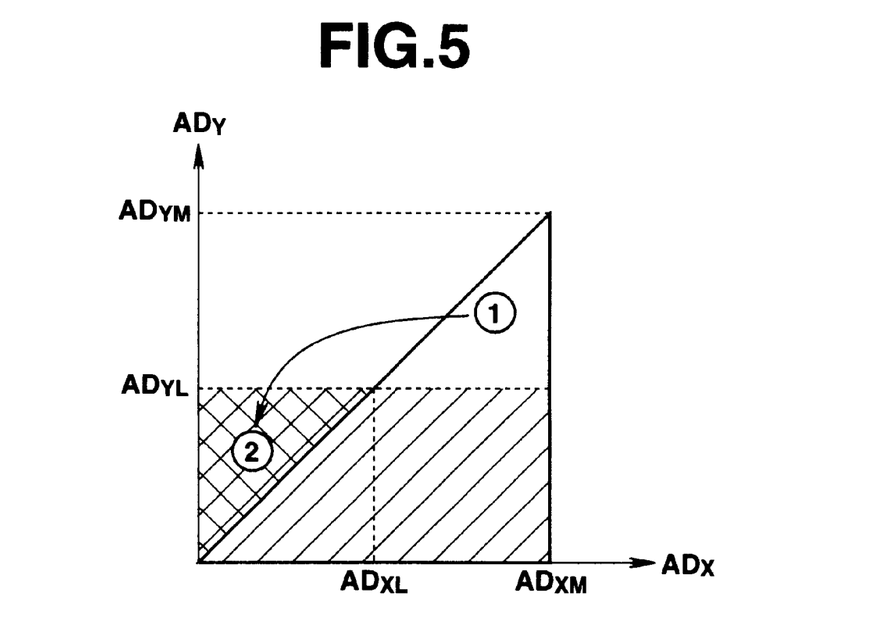
FIG. 5 is a diagram illustrating a memory map for explaining the principle of a modification of the embodiment according to the present invention.

This principle will be described with reference to FIG. 5. FIG. 5 is a diagram showing a memory map of the ROM look-up table 306. The address data ADx on the X-coordinate is address data of the I-component while the address data ADy on the Y-coordinate is address data of the Q-component. The region (1) is folded to the region (2). In the region (1), the address data ADx on the X-coordinate is set to more than folded address data ADXL being ½ of the maximum address data ADXM (shown in FIG. 5) while the address data ADy on the Y-coordinate is set to more than folded address data ADYL being ½ of the maximum address data ADYM (shown in FIG. 5).

Thus, the address range of the address data ADx on the X-coordinate on the memory map becomes unchanged but the address data ADy on the y-coordinate can be reduced to less than ½ of the folded address data ADy1. Hence the number of bits of the address data ADy on the y-coordinate can be halved. In this case, the address region of a ROM forming the ROM look-up table 306 is represented as the shaded rectangular area in FIG. 5. As a result, the memory capacity of the ROM can be reduced to ⅛ while the number of bits of the address data of the Q-component being the address data on the y-coordinate can be halved.

As described above, the phase decision circuit includes folded detection means that detects the address data ADx on the x-coordinate which is more than folded address data ADx1 as well as the address data ADy on the y-coordinate which is more than folded address data ADy1. When the folded detection means detects the address data satisfying the above-mentioned requirements, bits of the address data ADx on the x-coordinate except the most significant bit (MSB) are inverted while bits of the address data ADy on the y-coordinate except the most significant bit (MSB) are inverted. The most significant bits are removed because they are sign bits.

In the above description, the present invention has been applied to the PSK modulation system. However, the present invention can be applied as a phase decision circuit in the orthogonal amplitude modulation (QAM) system. In this case, in order to apply the present invention to the QAM system, data on the absolute value of an amplitude is read out from the ROM look-up table 306. Then the original data is demodulated based data on the absolute value and phase angle data of an amplitude.

In the phase decision circuit with the above-mentioned configuration according to the present invention, when eight quadrants are used, the memory capacity of the ROM look-up table can be reduced to ⅛, compared with the conventional memory capacity. Integrating the phase decision circuit of the present invention in an IC chip allows the chip area to be reduced so that the unit price per chip can be lowered.

Moreover, the number of addresses can be halved by folding back a portion of the ROM look-up table, so that the chip area can be more shrunk.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A phase decision circuit, comprising:

quadrant decision means for detecting a quadrant to which an input signal belongs, based on an I component and a Q component of said input signal, and then outputting quadrant data representing the detected quadrant;

a look-up table used to read phase angle data of said input signal with respect to a reference phase using the I component and the Q component of said input signal handled as address data;

address conversion means for converting said address data according to said quadrant data; and phase angle data correction means for correcting said phase angle data read out of said look-up table according to said quadrant data;

wherein said look-up table stores only phase angle data corresponding to a reference unit quadrant in a quadrant decided by said quadrant decision means;

wherein said address conversion means converts address data into address data corresponding to said reference unit quadrant wherein said phase angle correction means corrects the phase angle data read out of said look-up table to correspond to phase angle data in a quadrant to which said input signal belongs.

2. The phase decision circuit defined in claim 1, wherein said quadrant data represents whether or not quadrant data belongs to any one among eight quadrants.

3. The phase decision circuit defined in claim 1 or 2, wherein said input signal comprises a 4-phase PSK modulation signal; and wherein two-bit data is demodulated from said corrected phase angle data.

* * * * *

UNITED STATES PATENT AND TRADEMARK OFFICE
CERTIFICATE OF CORRECTION

PATENT NO. : 6,100,755

DATED : August 8, 2000

INVENTOR(S): Satoru ISHII

It is certified that an error appears in the above-identified patent and that said Letters Patent is hereby corrected as shown below:

On the title page, item [30], the Foreign Application Priority Data is not listed. It should read as follows:

--[30] Foreign Application Priority Data

June 25, 1997    [JP]    Japan ..........09-168920--

Signed and Sealed this

Seventeenth Day of April, 2001

*Attest:*

NICHOLAS P. GODICI

*Attesting Officer*    *Acting Director of the United States Patent and Trademark Office*